United States Patent
Kim et al.

(10) Patent No.: US 11,489,235 B2
(45) Date of Patent: Nov. 1, 2022

(54) BATTERY MODULE AND BATTERY PACK INCLUDING THE SAME

(71) Applicant: LG CHEM, LTD., Seoul (KR)

(72) Inventors: Soo-Youl Kim, Daejeon (KR); Young-Ho Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/757,228

(22) PCT Filed: Mar. 25, 2019

(86) PCT No.: PCT/KR2019/003456
§ 371 (c)(1),
(2) Date: Apr. 17, 2020

(87) PCT Pub. No.: WO2019/208938
PCT Pub. Date: Oct. 31, 2019

(65) Prior Publication Data
US 2021/0194101 A1      Jun. 24, 2021

(30) Foreign Application Priority Data

Apr. 25, 2018   (KR) .................. 10-2018-0048055

(51) Int. Cl.
*H01M 50/507*       (2021.01)
*H01M 50/249*       (2021.01)
(Continued)

(52) U.S. Cl.
CPC ....... *H01M 50/507* (2021.01); *H01M 10/482* (2013.01); *H01M 50/211* (2021.01);
(Continued)

(58) Field of Classification Search
CPC .... H01M 10/48; H01M 10/42; H01M 50/204; H01M 50/271; H01M 50/287;
(Continued)

(56) References Cited

U.S. PATENT DOCUMENTS 10,981,454 B2 *   4/2021   Choi .................. H01M 10/486
2012/0270094 A1   10/2012  Hohenthanner et al.
(Continued)

FOREIGN PATENT DOCUMENTS

JP       2020-514976 A       5/2020
KR    10-2012-0122007 A     11/2012
(Continued)

OTHER PUBLICATIONS

International Search Report issued in PCT/KR2019/003456 (PCT/ISA/210), dated Jun. 24, 2019.
(Continued)

*Primary Examiner* — Matthew T Martin
*Assistant Examiner* — Bartholomew A Hornsby
(74) *Attorney, Agent, or Firm* — Birch, Stewart, Kolasch & Birch, LLP (57) ABSTRACT

A battery module includes a module case formed with a hollow structure; a cell stack disposed inside the module case and including secondary battery cells stacked in one direction; and a bus bar frame having a plurality of bus bars for electrically connecting the secondary battery cells and a sensing member for sensing voltage of the secondary battery cells, which are installed at predetermined locations thereof, the bus bar frame being installed around the cell stack and disposed to be inserted into the module case integrally with the cell stack. The bus bar frame includes a horizontal frame disposed in a length direction of the cell stack; and a pair of vertical frames coupled to both ends of the horizontal frame
(Continued)

by hinges and disposed in a height direction at a front surface and a rear surface of the cell stack.

15 Claims, 7 Drawing Sheets (51) Int. Cl.
H01M 50/519 (2021.01)
H01M 50/569 (2021.01)
H01M 50/211 (2021.01)
H01M 50/503 (2021.01)
H01M 10/48 (2006.01)

(52) U.S. Cl.
CPC ....... *H01M 50/249* (2021.01); *H01M 50/503* (2021.01); *H01M 50/519* (2021.01); *H01M 50/569* (2021.01); *H01M 2220/20* (2013.01)

(58) Field of Classification Search
CPC ........ H01M 50/507; H01M 2/10; H01M 2/20; H01M 2/26
See application file for complete search history.

(56) References Cited

U.S. PATENT DOCUMENTS

| | | | |
|---|---|---|---|
| 2013/0216878 A1 | 8/2013 | Merriman et al. | |
| 2014/0017553 A1 | 1/2014 | Kikuchi et al. | |
| 2014/0134464 A1 | 5/2014 | Jang et al. | |
| 2016/0126531 A1 | 5/2016 | Kim et al. | |
| 2016/0226043 A1 | 8/2016 | Lee et al. | |
| 2018/0194235 A1 | 7/2018 | Kim et al. | |
| 2018/0248237 A1* | 8/2018 | Postler .............. | H01M 10/6557 |
| 2019/0001838 A1 | 1/2019 | Choi et al. | |
| 2019/0189979 A1 | 6/2019 | Choi et al. | |
| 2020/0014005 A1 | 1/2020 | Lee et al. | |

FOREIGN PATENT DOCUMENTS

| | | | | |
|---|---|---|---|---|
| KR | 10-2013-0118407 A | | 10/2013 | |
| KR | 10-2014-0072689 A | | 6/2014 | |
| KR | 10-2015-0033851 A | | 4/2015 | |
| KR | 10-2015-0109726 A | | 10/2015 | |
| KR | 10-2015-0142338 A | | 12/2015 | |
| KR | 10-2016-0048658 A | | 5/2016 | |
| KR | 10-2017-009475 A | | 8/2017 | |
| KR | 10-2017-0103232 A | | 9/2017 | |
| KR | 20170103232 A | * | 9/2017 | |
| KR | 20170103232 A | * | 9/2017 | .............. B60L 11/18 |
| KR | 10-1829350 B1 | | 2/2018 | |
| KR | 10-2018-0038253 A | | 4/2018 | |
| KR | 10-1844852 B1 | | 4/2018 | |
| KR | 101844852 B1 | * | 4/2018 | |
| KR | 101844852 B1 | * | 4/2018 | |
| KR | 10-2018-0099437 A | | 9/2018 | |
| WO | WO 2017/149144 A1 | | 9/2017 | |

OTHER PUBLICATIONS

Extended European Search Report for European Application No. 19792245.3, dated Jan. 26, 2021.

\* cited by examiner

BATTERY MODULE AND BATTERY PACK INCLUDING THE SAME

TECHNICAL FIELD

The present disclosure relates to a battery module and a battery pack including the same, and more particularly, to a battery module having improved structural safety and enhanced assembling and a battery pack including the same.

The present application claims priority to Korean Patent Application No. 10-2018-0048055 filed on Apr. 25, 2018 in the Republic of Korea, the disclosures of which are incorporated herein by reference.

BACKGROUND ART

In smaller mobile devices, one or a few secondary battery cells are used per device. However, middle-sized or large-sized devices such as a vehicle use a middle-sized or large-sized battery module in which a plurality of secondary battery cells are electrically connected due to the need for high power large capacity, or a battery pack implemented by connecting a plurality of such battery modules.

In an electric vehicle, the battery module is generally mounted to a car body or in a trunk room. Thus, the battery module or the battery pack for an electric vehicle should be as small as possible with very high energy density and should also be able to maintain structural stability even in an environment where vibration and impact are repeatedly applied. For this purpose, pouch-type secondary battery cells, which are easy to stack and have high energy density relative to volume, are widely used to configure a battery module for an electric vehicle.

The pouch-type secondary battery cells include electrode leads, which serve as electrode terminals and have the form of a thin metal sheet, so that a battery module including the pouch-type secondary battery cells include bus bars having the form of a metal plate shape to serve as a means for easily and stably connecting the electrode leads. The bus bars may be generally mounted in a predetermined pattern on a board-shaped bus bar frame.

In addition, the battery module including the pouch-type secondary battery cells includes a large number of wires, voltage sensing components such as a printed circuit board and a connector, and a module case for accommodating and protecting the pouch-type secondary battery cells therein in order to sense and control overvoltage, overcurrent or overheating occurring at some secondary battery cells.

Meanwhile, when designing the battery module for an electric vehicle, the safety against external impact is one of the important considerations. The pouch-type secondary battery cells have low mechanical stiffness, and a portion of the pouch-type secondary battery cell where the electrode lead protrudes is particularly susceptible to the external impact. Here, a bus bar frame is mounted to the portion where the electrode lead protrudes. However, in the conventional battery module, if an external impact is applied, the bus bar frame is often bent or broken toward the secondary battery cells to directly hit the portion where the electrode lead protrudes, thereby damaging the secondary battery cells. Thus, there is a demand for a bus bar frame to minimize the damage of the secondary battery cells even if the bus bar frame is deformed due to external impact.

In addition, the number of voltage sensing components is proportional to the number of secondary battery cells, resulting in a large number of components and a somewhat complicated connection structure. A middle-sized or large-sized battery module has a limit in its assembling space therein due to the voltage sensing components. In particular, the sensing wire may be disconnected due to an external impact, which may cause various events. Thus, it is necessary to find a way for arranging the voltage sensing components inside the module case together with secondary battery cells in a safely and space-efficient way.

DISCLOSURE

Technical Problem

The present disclosure is designed to solve the problems of the related art, and therefore the present disclosure is directed to providing a battery module, which may have a compact size by assembling bus bars, a printed circuit board and voltage sensing components through space-efficient utilization of a bus bar frame and a module case In addition, the present invention is directed to providing a battery module having a bus bar frame, which may ensure enhanced assembling with secondary battery cells and minimize damage to the secondary battery cells when an external impact is applied.

Technical Solution

In one aspect of the present disclosure, there is provided a battery module, comprising: a module case formed with a hollow structure; a cell stack disposed inside the module case and including secondary battery cells stacked in one direction; and a bus bar frame having a plurality of bus bars for electrically connecting the secondary battery cells and a sensing member for sensing voltage of the secondary battery cells, which are installed at predetermined locations thereof, the bus bar frame being installed around the cell stack and disposed to be inserted into the module case integrally with the cell stack, wherein the bus bar frame includes: a horizontal frame disposed in a length direction of the cell stack; and a pair of vertical frames coupled to both ends of the horizontal frame by hinges and disposed in a height direction at a front surface and a rear surface of the cell stack.

The battery module includes a printed circuit board. Each of the pair of vertical frames may have slots formed therethrough at predetermined intervals along one direction so that electrode leads of the secondary battery cells pass through the slots, and assembling guides provided between the slots, and the plurality of bus bars and the printed circuit board are connected to the sensing member and may be selectively mounted to the assembling guides.

The assembling guides may include a plurality of first assembling guides to which the plurality of bus bars are respectively mounted and a second assembling guide to which the printed circuit board is mounted, and the second assembling guide may be provided to any one of the pair of vertical frames.

The first assembling guide may include a body provided with a size corresponding to an area of the bus bar and the second assembling guide may include a body provided with a size corresponding to an area of the printed circuit board, and each body may be curved in a direction opposite to the cell stack so that a cross-section of each body has an arc form.

Each body may be curved to be located away from one side of the cell stack by a distance greater than at least a terrace length of the secondary battery cells, so that a predetermined impact buffering space is provided between each body and one side of the cell stack.

Each of the plurality of bus bars may has a rectangular shape with a predetermined thickness, each of the first assembling guides may have a corner support member configured to surround and accommodate a bottom corner of one of the plurality of bus bars, each of the pair of vertical frames may have a hook provided at an upper portion of each of the first assembling guides, for each of the first assembling guides, the bottom corner of the one of the plurality of bus bars may be fitted into the corner support member, and a top end of the one of the plurality of bus bars may be caught by the hook to fix the location of the bus bar.

Each of first assembling guides may further include a rib configured to define an inner empty space surrounded by the body, and one surface of one of the plurality of bus bars is supported in contact with the rib.

The printed circuit board may be disposed at the second assembling guide so that electronic elements thereof are accommodated in an inner space surrounded by the body of the second assembling guide.

The second assembling guide may further include at least one pillar provided at an inner surface of the body to protrude toward the printed circuit board, the printed circuit board may have holes in a number corresponding to the at least one pillar, and the at least one pillar may be put into the holes of the printed circuit board so that the printed circuit board is fixed to the second assembling guide.

Any one of the pair of vertical frames may be defined as a front frame to which the printed circuit board is mounted, the other of the pair of vertical frames may be defined as a rear frame, the sensing member may include a first voltage sensor connected to each of the plurality of bus bars located at the front frame to sense voltage of the secondary battery cells; and a second voltage sensor connected to each of the plurality of bus bars located at the rear frame to sense voltage of the secondary battery cells, the first voltage sensor and the second voltage sensor may be connected to the printed circuit board, and the second voltage sensor may be connected to the printed circuit board through a transmission member selected from a plurality of wires, a flat flexible cable (FFC), and a flexible printed circuit board (FPCB).

The horizontal frame may be disposed at an upper portion of the cell stack, and the transmission member may be attached to a lower surface of the horizontal frame.

Both side ends of the horizontal frame may be placed on top ends of the pair of vertical frames, and a first portion of both side ends of the horizontal frame may have a smaller thickness than a second portion of both of the side ends of the horizontal frame so that the first portion is not in contact with the top ends of the pair of vertical frames, thereby forming an opening through which the transmission member is pulled out.

In another aspect of the present disclosure, there is also provided a battery pack, comprising at least one battery module described above.

The battery pack may be used as an energy source of a device such as an electric vehicle or a power storage system.

Advantageous Effects

According to an embodiment of the present disclosure, it is possible to provide a battery module, which may have a compact size by assembling bus bars, a printed circuit board and voltage sensing components through space-efficient utilization of a bus bar frame and a module case According to another embodiment of the present invention, it is possible to provide a battery module having a bus bar frame, which may ensure enhanced assembling with secondary battery cells and minimize damage to the secondary battery cells when an external impact is applied.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
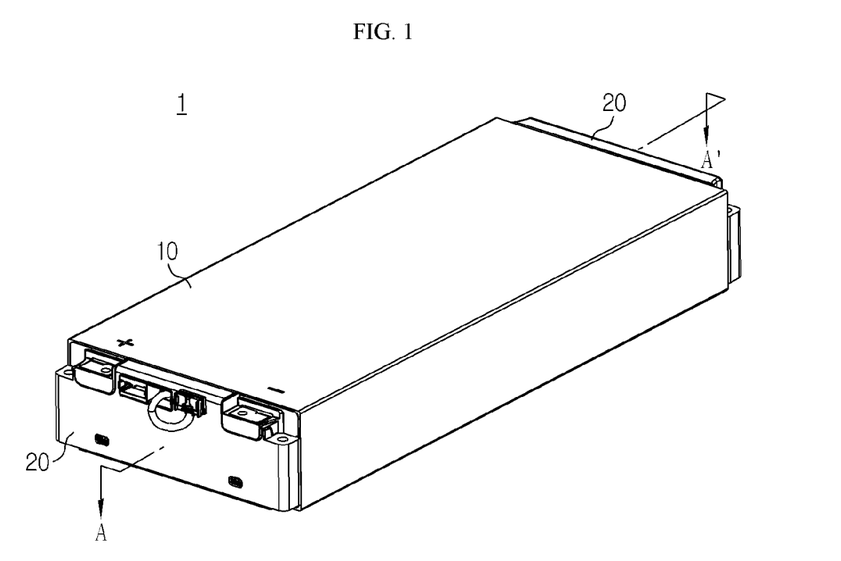
FIG. 1 is a perspective view showing a battery module according to an embodiment of the present disclosure.
Figure 2:
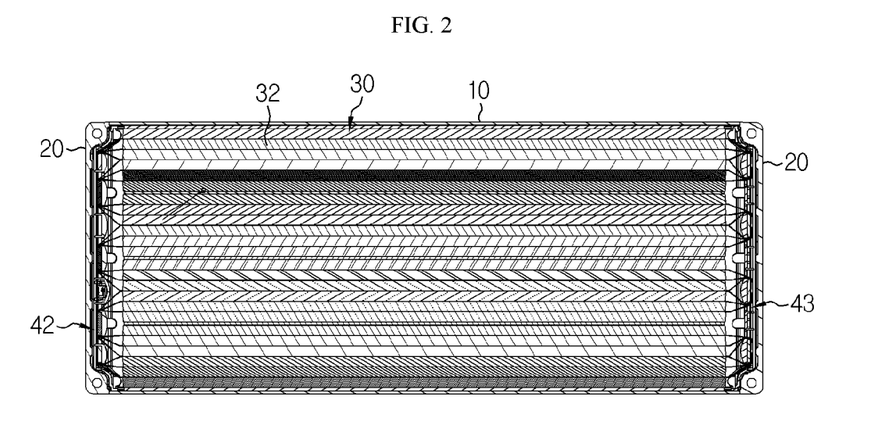
FIG. 2 is a cross-sectioned view, taken along the line A-A' of FIG. 1.
Figure 3:
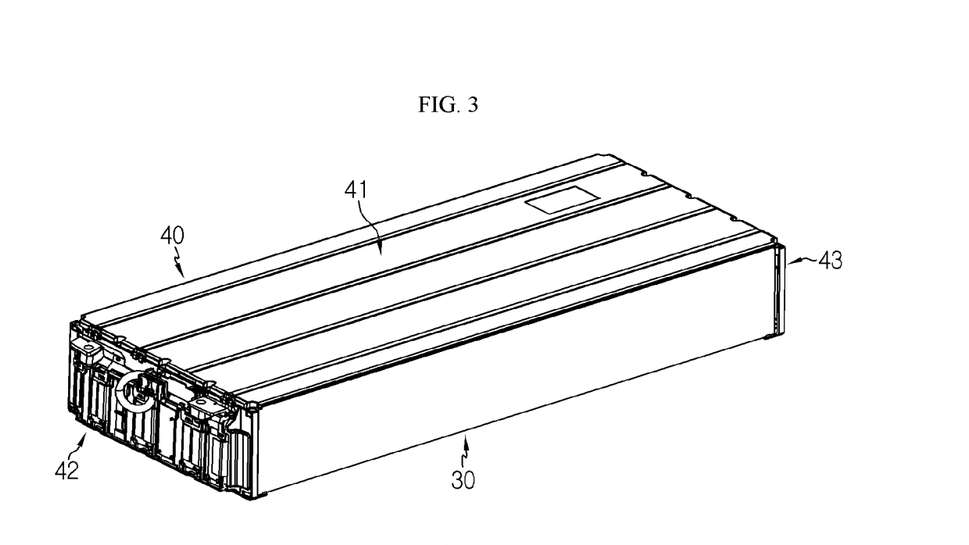
FIG. 3 is a perspective view showing a cell bus bar frame assembly according to an embodiment of the present disclosure.
Figure 4:
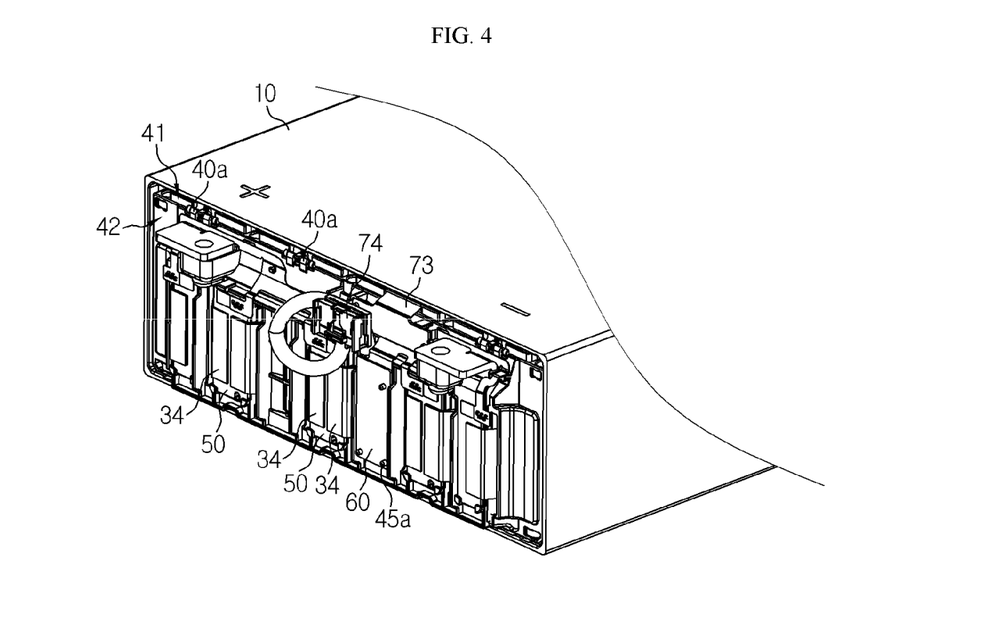
FIG. 4 is a perspective view showing a front surface of the battery module from which a module cover is separated.

FIG. 1 is a perspective view showing a battery module according to an embodiment of the present disclosure, FIG. 2 is a cross-sectioned view, taken along the line A-A' of FIG. 1, FIG. 3 is a perspective view showing a cell bus bar frame assembly according to an embodiment of the present disclosure, and FIG. 4 is a perspective view showing a front surface of the battery module from which a module cover is separated.

Referring to FIGS. 1 to 4, a battery module 1 according to an embodiment of the present disclosure includes a module case 10, a module cover 20, a cell stack 30, and a bus bar frame 40.

The module case 10 is a hollow structure capable having a rectangular tube shape, which may accommodate the cell stack 30 and the bus bar frame 40 in an inner space thereof, to give a mechanical support force to the cell stack 30 and protect inner components such as the cell stack 30 against external impact or the like. Thus, the module case 10 may be made of a metal such as steel to ensure rigidity.

The module case 10 is fabricated to have a dimension such that the cell bus bar frame assembly having the cell stack 30 and the bus bar frame 40 may be fitted into the inner space thereof. Since the size of the module case 10 is reduced as above, the battery module 1 may have a slim design while keeping a high energy density per unit volume.

In addition, since the cell bus bar frame assembly may be tightly fitted into and compressed in the inner space of the module case 10, the secondary battery cells 32 may be inhibited from moving even though a separate fixing component such as a cartridge is not used.

The module cover 20 is mounted to an opening of the module case 10 to prevent electrode leads 34 and bus bars 50 of the secondary battery cell 32 from being exposed to the outside. The module cover 20 may be made of an insulating material such as plastic and may have holes to draw out a wire connector 74 and an electrode terminal from the inside of the battery module 1.

The cell stack 30 may be an aggregate of a plurality of secondary battery cells 32. In this embodiment, the secondary battery cell 32 is a bi-directional pouch-type secondary battery having a positive electrode lead and a negative electrode lead protruding in opposite directions. The secondary battery cells 32 are stacked vertically and are closely arranged in a horizontal direction to form the cell stack 30. A buffer pad may be further interposed between the secondary battery cells 32. The buffer pad may absorb an expanding force caused by swelling of the secondary battery cells 32 during the charging and discharging process.

The pouch-type secondary battery may include an electrode assembly, an electrolyte and a pouch exterior. The pouch exterior may include two pouches, and a concave inner space may be formed in at least one of the two pouches. In addition, the electrode assembly may be accommodated in the inner space of the pouch. Sealing portions are provided at outer circumferences of the two pouches, and the sealing portions are welded to each other so that the inner space accommodating the electrode assembly may be sealed. The electrode lead 34 may be attached to the electrode assembly, and the electrode lead 34 may be disposed between the sealing portions of the pouch exterior and exposed out of the pouch exterior to function as an electrode terminal of the secondary battery.

The bus bar frame 40 of this embodiment includes a horizontal frame 41 and a pair of vertical frames 42, 43, which are made of an insulating material to fix the bus bars 50 and the electrode terminals. In the bus bar frame 40, a plurality of bus bars 50 for electrically connecting the plurality of secondary battery cells 32 and a sensing member for sensing the voltage of the plurality of secondary battery cells 32 may be assembled at predetermined locations.

The horizontal frame 41 may be disposed in the length direction of the cell stack 30 at an upper portion of the cell stack 30, and the pair of vertical frames 42, 43 may be disposed at the cell stack 30 in the height direction at a front surface and a rear surface of the cell stack 30 to partially surround the periphery of the cell stack 30.

For example, as shown in FIG. 3, the bus bar frame 40 may be installed at the cell stack 30 in an approximate "⊂" shape corresponding to the length and width of the cell stack 30 to surround the upper portion, the front surface and the rear surface of the cell stack 30. Here, the front surface and the rear surface of the cell stack 30 indicate the positions where the electrode leads 34 of the secondary battery cells 32 are located, and the upper portion of the cell stack 30 indicates edge portions of the standing-up secondary battery cells 32.

In particular, the pair of vertical frames 42, 43 are coupled to the horizontal frame 41 by a hinge 40a to be rotatable, for instance at a predetermined angle, with respect to each end of the horizontal frame 41. Since the vertical frames 42, 43 are provided to be rotatable with respect to the horizontal frame 41, the electrode leads 34 may be welded more easily when the bus bar frame 40 is assembled to the cell stack 30.

In other words, in order to assemble the bus bar frame 40 and the cell stack 30, one end of each of the electrode leads 34 of the secondary battery cells 32 is inserted into one of the slots 47 provided in the vertical frames 42, 43, and then the ends of the electrode leads 34 are bent and welded to the surface of the corresponding bus bars 50 by ultrasonic welding. For example, if the pair of vertical frames 42, 43 are fixed at right angles to the horizontal frame 41, when the bus bar frame 40 is assembled to cover the upper portion of the cell stack 30, it is possible to secure a space where the electrode leads 34 of each secondary battery cell 32 may be inserted into one of the slots 47 of the vertical frames 42, 43.

However, in the present disclosure, since the horizontal frame 41 is placed on the cell stack 30 and the vertical leads 42, 43 are rotatable at predetermined angles, it is possible to secure the space where the electrode leads 34 of each secondary battery cell 32 are fitted into the slots 47 of the vertical frames 42, 43. Thus, even if the bus bar frame 40 has the "⊂" structure corresponding to the dimension of the cell stack 30, it is possible to assemble any one of the vertical frames 42, 43 to the front surface of the cell stack 30 and then assemble the other of the vertical frames 42, 43 to the rear surface of the cell stack 30 without damaging the electrode leads 34.

Figure 5:
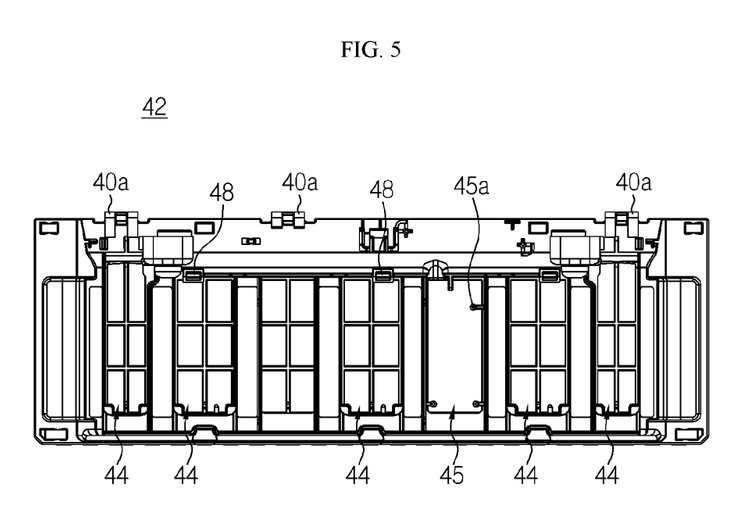
FIG. 5 is a front view showing a front frame of a bus bar frame according to an embodiment of the present disclosure.

Referring to FIGS. 4 and 5, the pair of vertical frames 42, 43 have the slots 47 formed at predetermined intervals along one direction so that the electrode leads 34 of the secondary battery cell 32 pass therethrough, and assembling guides 44, 45 provided between the slots 47. The bus bars 50 and a printed circuit board 60 may be selectively mounted to the assembling guides 44, 45. The printed circuit board 60 is a component connected to the sensing member for measuring the voltage of the secondary battery cells 32 and transmits the voltage information of the secondary battery cells 32 to a BMS (not shown).

The assembling guides 44, 45 include a plurality of first assembling guides 44 and a single second assembling guide 45. The plurality of first assembling guides 44 may be provided in a number corresponding to the number of the bus bars 50 required for at least the battery module 1, and the second assembling guide 45 may be provided in a number corresponding to the number of the printed circuit boards 60.

Hereinafter, for convenience of explanation, the vertical frame disposed at the front surface of the cell stack 30 is referred to as a front frame 42, and the vertical frame disposed at the rear surface of the cell stack 30 is referred to as a rear frame 43.

Figure 7:
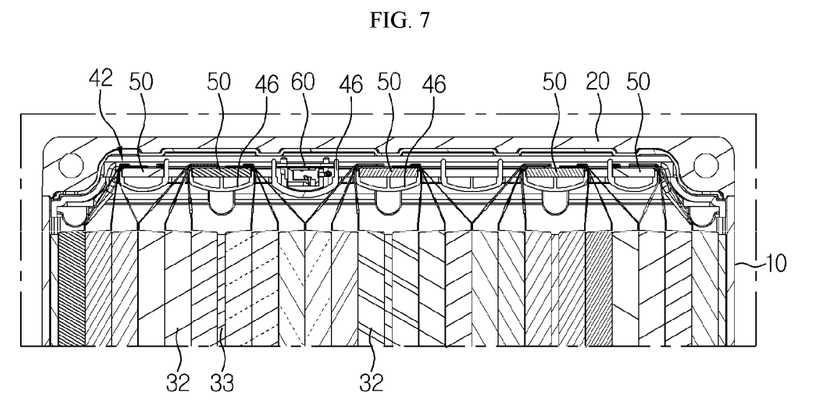
FIGS. 7 and 8 are enlarged views showing the front frame of FIG. 2.

In this embodiment, referring to FIG. 7 along with FIG. 2, the cell stack 30 includes 24 pouch-type secondary battery cells 32 in total. In addition, three secondary battery cells 32 are connected in parallel as a group, and eight groups, each having three secondary battery cells 32 connected in parallel, are connected in series.

Five bus bars 50 are mounted to the first assembling guides 44 of the front frame 42 and four bus bars 50 are mounted to the first assembling guides 44 of the rear frame 43. The second assembling guide 45 is added to the front frame 42 so that the printed circuit board 60 is mounted thereto.

The secondary battery cells 32 of each group are connected in series as the electrode leads 34 are integrally attached by welding to the corresponding bus bars 50 through the slots 47 formed in the front frame 42 and the rear frame 43.

The positive electrode leads of the secondary battery cells 32 of the first group are welded to a first bus bar 50 according an arraying order of the bus bars 50 of the front frame 42, and the negative electrode leads of the secondary battery cells 32 of the eighth group are welded to a fifth bus bar 50 according the arraying order of the bus bars 50 of the front frame 42. In addition, the positive electrode leads of the secondary battery cells 32 of any one group and the negative electrode leads of the secondary battery cells 32 of another group are respectively welded to the bus bars 50 of the front frame 42 and the rear frame 43, so that 24 secondary battery cells 32 in total are connected in series and in parallel.

The front frame 42 and the rear frame 43 are different in the number and arrangement interval of the first assembling guides 44 and the presence or absence of the second assembling guide 45 but basically have the same structure. Therefore, hereinafter, the vertical frames 42 and 43 will be described with reference to the front frame 42.

As shown in FIGS. 5 to 9, the first assembling guide 44 and the second assembling guide 45 include a body 46 provided in a size corresponding to the area of the bus bar 50 or the printed circuit board 60, respectively. The body 46 has a cross-section that is curved in a direction opposite to the cell stack 30 to have an arc form. The first assembling guide 44 and the second assembling guide 45 have a convex rear surface.

In this embodiment, the bus bar 50 may be a rectangular metal plate bus bar 50 having a predetermined thickness. The first assembling guides 44 may include a rib 44b for defining an inner hollow space surrounded by the body 46 and corner support members 44a for surrounding and accommodating bottom corners of the bus bar 50, respectively.

Figure 6:
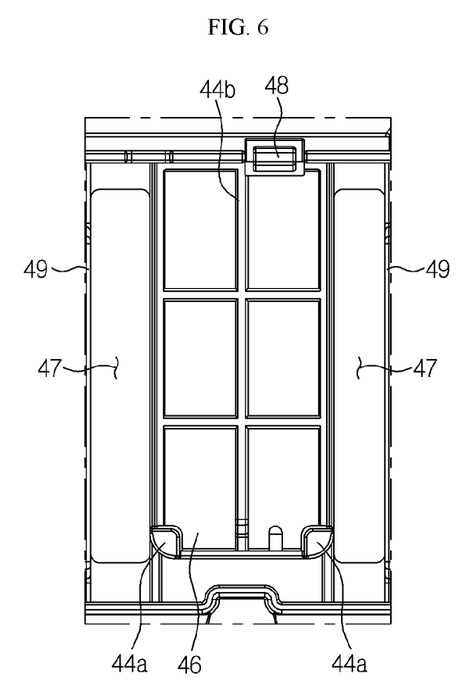
FIG. 6 is a partially enlarged view of FIG. 5.

Since the rib 44b is disposed in a lattice shape in the inner hollow space of the body 46, the body 46 may have rigidity. A wide surface of the bus bar 50 is placed on the front surface of the body 46 to which the rib 44b of a lattice shape is applied. The corner support members 44a may have a pocket shape capable of holding the bottom corners of the bus bar 50 when the bus bar 50 is fitted thereto.

Figure 9:
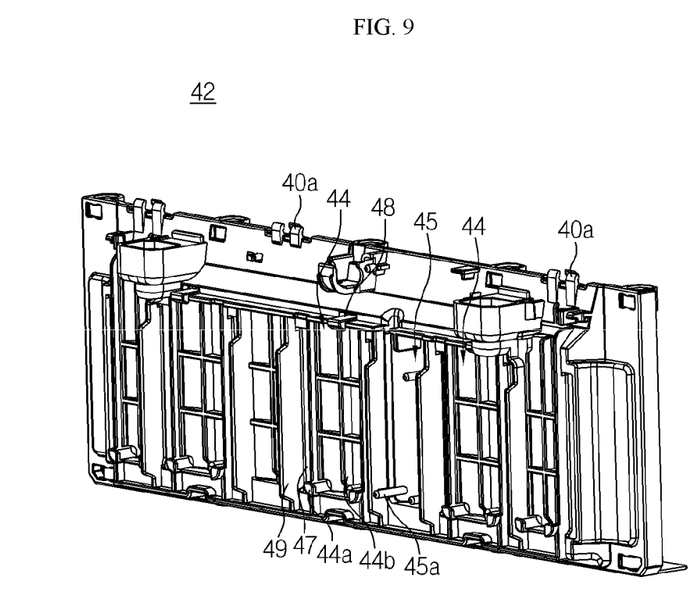
FIG. 9 is a perspective view showing the front frame of FIG. 5.

The upper end of the bus bar 50 may be fixed by a hook 48. As shown in FIG. 9, the hook 48 may be disposed on the first assembling guides 44. The hook 48 may protrude in a cantilever shape with respect to the front surface of the front frame 42, and an end of the hook 48 is bent downwards.

The bus bar 50 may be inserted into the corner support members 44a from a lower end thereof and be then attached to the first assembling guide 44 such that a back surface of the bus bar 50 is in close contact with the rib 44b of the lattice shape. At this time, after the hook 48 is bent upward, if the bus bar 50 contacts the rib 44b of the lattice shape, the hook 48 is restored to its original location so that the end of the hook 48 is caught on the upper end of the bus bar 50. Thus, the bus bar 50 may be fixed to the first assembling guide 44 by the hook 48.

As described above, bus bars 50 may be installed to the first assembling guide 44 of the front frame 42, and the electrode leads 34 of the secondary battery cells 32 may be attached to the bus bars 50. At this time, since the body 46 of the first assembling guide 44 is formed in an arc shape, the electrode leads 34 of the secondary battery cells 32 may be bent along the curved surface of the body 46 and be guided to be easily inserted into the slots 47 located at both sides of the body 46.

Figure 8:
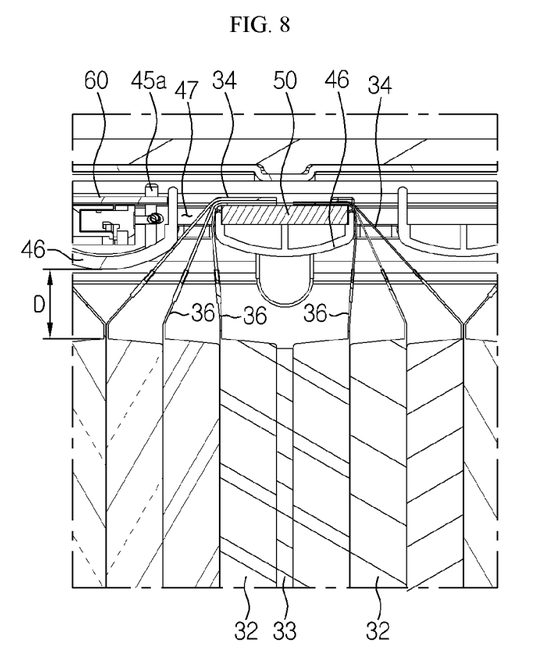

In addition, referring to FIGS. 7 and 8, when the front frame 42 is assembled to the front surface of the cell stack 30, the bodies 46 of the first assembling guide 44 and the second assembling guide 45 may have a curved surface with a gently protruding depth so as to be located away from one side of the cell stack 30 (the body of the secondary battery cell 32) by a distance D greater than the length of a terrace 36 of the secondary battery cells 32.

In this case, a predetermined impact buffering space may be provided between the body 46 and one side of the cell stack 30. If the impact buffering space is secured, for example, even though a force less than a predetermined level is applied to compress the front surface or the rear surface of the battery module 1, the rear surface of the front frame 42, namely the bodies 46 of the first assembling guides and second assembling guide 45, does not directly contact the bodies of the secondary battery cells 32, thereby preventing an event that the safety performance of the battery module 1 is degraded.

On the other hand, even if the back surface of the front frame 42 makes contact with an external force over a predetermined level, since the body 46 of the assembling guide has a gentle curved surface, the impact applied to the secondary battery cells 32 may be mitigated.

Also, barriers 49 for preventing an electric short between the electrode leads 34 may be provided between the first assembling guides 44. The barriers 49 function like a wall that protrudes more than the attachment surface of the bus bar 50 to separate the neighboring bus bars 50 from each other. Thus, it is possible to prevent the electrode leads 34 of the secondary battery cells 32 of the unit group attached to each bus bar 50 from being short-circuited by means of the barriers 49.

The second assembling guide 45 is a component for mounting the printed circuit board 60 to the front frame 42. Referring to FIGS. 7 and 8 again, the printed circuit board 60 may be disposed at the second assembling guide 45 such that electronic elements thereof are accommodated in the inner space surrounded by the body 46. If the electronic elements of the printed circuit board 60 are disposed toward the inner space of the body 46 as above, it is possible to protect the electronic elements and prevent the module cover 20 from interfering or colliding with the electronic elements of the printed circuit board 60 when the module cover 20 covers the front frame 42.

The second assembling guide 45 further includes at least one pillar 45a protruding in a direction from the inner surface of the body 46 toward the printed circuit board 60. The printed circuit board 60 may have holes in a number corresponding to the number of pillars 45a.

Figure 10:
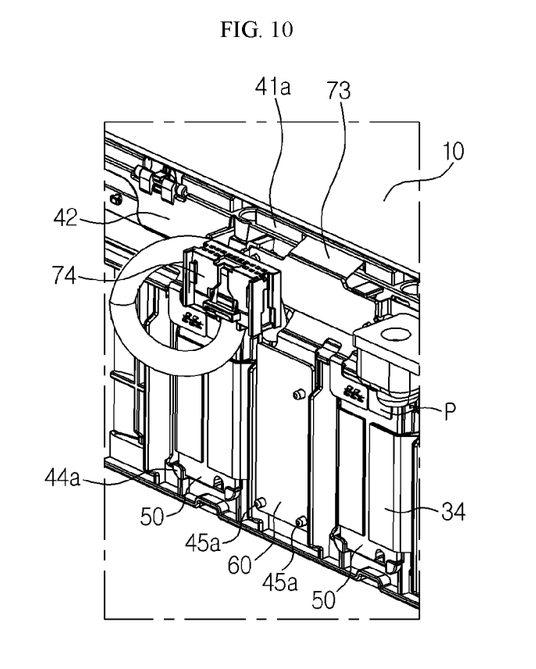
FIG. 10 is an enlarged view showing a region of the front frame of FIG. 4 to which a printed circuit board is mounted.

For example, as shown in FIG. 9, the second assembling guide 45 of this embodiment has three pillar 45a. In addition, three holes are formed in the printed circuit board 60. As shown in FIG. 10, the printed circuit board 60 may be fixed to the second assembling guide 45 by putting the three pillars 45a into the three holes.

Figure 11:
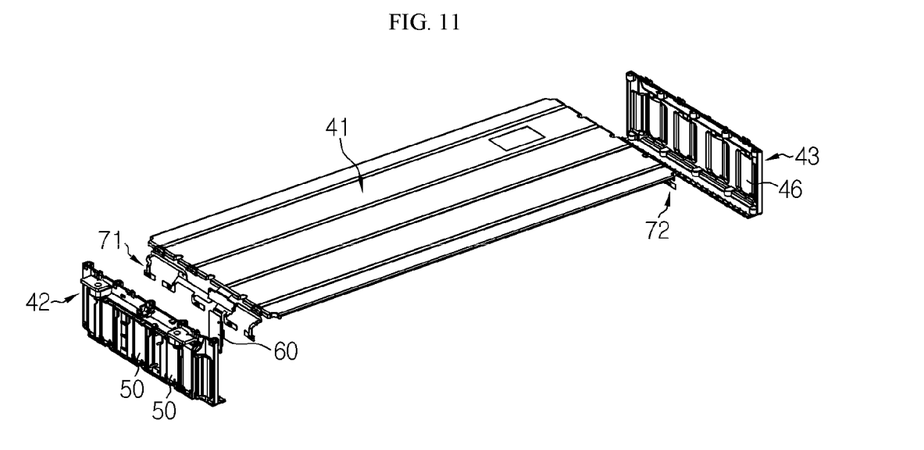
FIGS. 11 and 12 are partially exploded perspective views showing the bus bar frame according to an embodiment of the present disclosure to which a sensing member is mounted.
Figure 12:
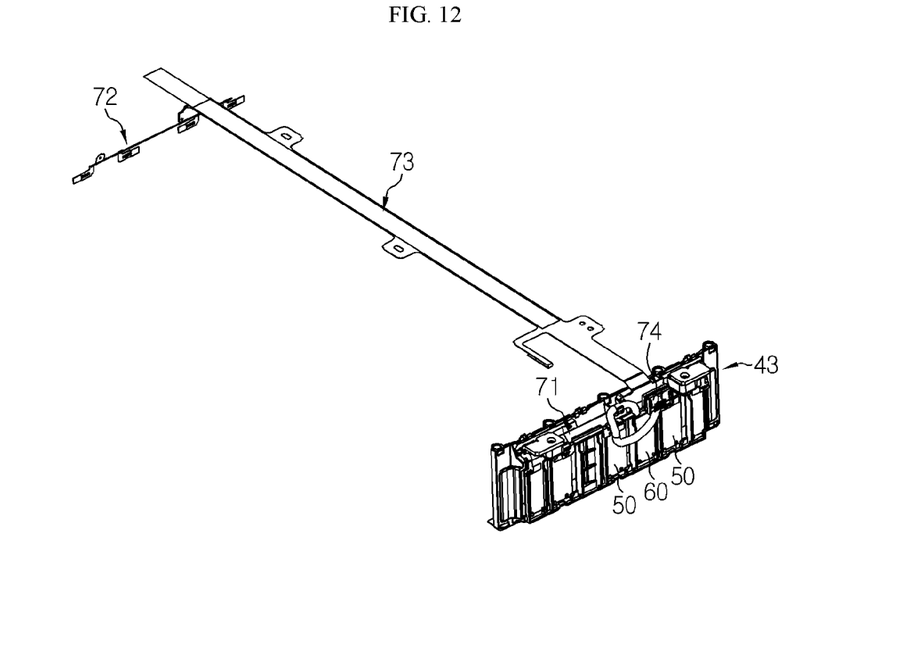
Figure 13:
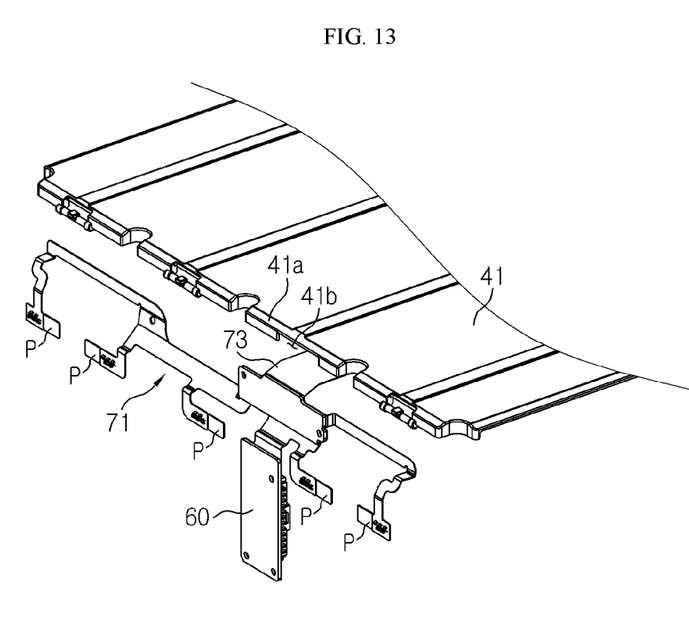
FIG. 13 is a partially enlarged view of FIG. 11.

Meanwhile, referring to FIGS. 11 to 13, the battery module 1 according to an embodiment of the present disclosure further includes a sensing member installed at the bus bar frame 40.

The sensing member may include a first voltage sensing unit 71 connected to the bus bars 50 located at the front frame 42 to sense the voltage of the secondary battery cells 32, and a second voltage sensing unit 72 connected to the bus bars 50 located at the rear frame 43 to sense the voltage of the secondary battery cells 32.

Since the secondary battery cells 32 of one unit group are connected in series through the bus bars 50, the voltage value at each bus bar 50 corresponds to the voltage value of the secondary battery cells 32 connected to each bus bar 50. In this embodiment, the first voltage sensing unit 71 has five sensing pins P, and the five sensing pins P are respectively attached to five bus bars 50 located at the front frame 42 to sense the voltage value of the bus bars 50 at the corresponding locations. Similarly, the second voltage sensing unit 72 has four sensing pins P, and the four sensing pins P are attached to four bus bars 50 located at the rear frame 43 to sense the voltage value of the bus bars 50 at the corresponding locations.

The voltage values of the secondary battery cells 32 sensed by the first and second voltage sensing units 71, 72 are transmitted to the printed circuit board 60, and the printed circuit board 60 transmits the voltage information to the BMS. At this time, the printed circuit board 60 may be connected to a BMS (not shown) through the wire connector 74.

Since the first voltage sensing unit 71 and the printed circuit board 60 are disposed at the front frame 42, the connection between them is relatively simple. However, since the second voltage sensing unit 72 is disposed at the rear frame 43, an additional means is required to connect to the printed circuit board 60. To this end, in the present disclosure, a transmission member 73 for connecting the second voltage sensing unit 72 to the printed circuit board 60 is further included.

As the transmission member 73, any one of a harness wire, a flat flexible cable (FFC), and a flexible printed circuit board (FPCB) may be employed. Preferably, using FFC or the FPCB as the transmission member 73 may be advantageous to enhance space utilization and prevent the risk of short circuit between conductors.

The transmission member 73 may be fixedly attached to a lower surface of the horizontal frame 41. A groove may be formed at the lower surface of the horizontal frame 41 along the length direction so that the transmission member 73 is fitted and attached into the groove.

In addition, as shown in FIGS. 10 and 13, the groove in the bottom surface of the horizontal frame extends to a front edge of the horizontal frame to form an opening 41b. When the horizontal frame 41 is supported on the front frame 42 the edge 41a of the horizontal frame 41 contacts the top end of the front frame 42, and opening 41b allows the transmission member 73 to be pulled out.

For example, a portion of the horizontal frame 41 may have a reduced thickness so as not to contact the top edge of the front frame 42, thereby forming the opening 41b. The transmission member 73 may be pulled out over the top end of the front frame 42 through the opening 41b and be wired as the front surface of the front frame 42. In addition, the second assembling guide 45 of the front frame 42 is positioned under the opening 41b, so that the printed circuit board 60 connected to the transmission member 73 may be easily mounted.

According to this embodiment configured as above, since components such as the bus bars 50, the printed circuit board 60 and the sensing member may be efficiently arranged in the inner space of the bus bar frame 40 and the module case 10, it is possible to provide a battery module 1 having good structural stability and high energy density per unit volume.

Meanwhile, a battery pack (not shown) according to an embodiment of the present disclosure includes at least one battery module 1 as described above.

At this time, in addition to the battery module 1, the battery pack may further include a case (not shown) for accommodating the battery module 1 and various devices (not shown) for controlling the charging and discharging of the battery module 1 such as a battery management system (BMS), a current sensor and a fuse.

The battery module 1 according to an embodiment of the present disclosure may also be applied to a vehicle such as an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A battery module, comprising:
a module case formed with a top plate, a bottom plate and side plate to form a hollow structure;
a cell stack disposed inside the module case and including secondary battery cells stacked in one direction; and
a bus bar frame having a plurality of bus bars for electrically connecting the secondary battery cells and a sensing member for sensing voltage of the secondary battery cells, which are installed at predetermined locations thereof, the bus bar frame being installed around the cell stack and disposed to be inserted into the module case integrally with the cell stack;
wherein the bus bar frame includes:
a horizontal frame disposed between the upper plate of the module case and the cell stack; and
a pair of vertical frames coupled to both ends of the horizontal frame by hinges and disposed in a height direction at a front surface and a rear surface of the cell stack,
wherein the pair of vertical frames includes:
slots formed therethrough at predetermined intervals along the one direction so that electrode leads of the secondary battery cells pass through the slots; and
assembling guides provided between the slots and on which the bus bar or printed circuit board is mounted,
wherein each of the assembling guides includes a body provided with a size corresponding to the bus bar or the printed circuit board,
wherein the body is curved in shape of an arc and located away from one side of the cell stack by a distance greater than at least a terrace length of the secondary battery cells, so that a predetermined impact buffering space is provided between the body and one side of the cell stack.

2. The battery module according to claim 1, wherein the assembling guides include a plurality of first assembling guides to which the plurality of bus bars are respectively mounted and a second assembling guide to which the printed circuit board is mounted, and the second assembling guide is provided to any one of the pair of vertical frames.

3. The battery module according to claim 2, wherein each of the plurality of bus bars has a rectangular shape with a predetermined thickness,
  wherein each of the first assembling guides has a corner support member configured to surround and accommodate a bottom corner of one of the plurality of bus bars, and each of the pair of vertical frames has a hook provided at an upper portion of each of the first assembling guides, and
  wherein, for each of the first assembling guides, the bottom corner of the one of the plurality of bus bars is fitted into the corner support member, and a top end of the one of the plurality of bus bars is caught by the hook to fix the location of the bus bar.

4. The battery module according to claim 2, wherein each of the first assembling guides further includes a rib configured to define an inner empty space surrounded by the body, and one surface of one of the plurality of bus bars is supported in contact with the rib.

5. The battery module according to claim 2, wherein the printed circuit board is disposed at the second assembling guide so that electronic elements thereof are accommodated in an inner space surrounded by the body of the second assembling guide.

6. The battery module according to claim 2, wherein the second assembling guide further includes at least one pillar provided at an inner surface of the body to protrude toward the printed circuit board, and
  wherein the printed circuit board has holes in a number corresponding to the at least one pillar, and the at least one pillar is put into the holes of the printed circuit board so that the printed circuit board is fixed to the second assembling guide.

7. The battery module according to claim 1, wherein any one of the pair of vertical frames is defined as a front frame to which the printed circuit board is mounted, and the other of the pair of vertical frames is defined as a rear frame,
  wherein the sensing member includes:
    a first voltage sensor connected to each of the plurality of bus bars located at the front frame to sense voltage of the secondary battery cells; and
    a second voltage sensor connected to each of the plurality of bus bars located at the rear frame to sense voltage of the secondary battery cells,
  wherein the first voltage sensor and the second voltage sensor are connected to the printed circuit board, and the second voltage sensor is connected to the printed circuit board through a transmission member selected from a plurality of wires, a flat flexible cable (FFC), and a flexible printed circuit board (FPCB).

8. The battery module according to claim 7, wherein the horizontal frame is disposed at an upper portion of the cell stack, and the transmission member is attached to a lower surface of the horizontal frame.

9. The battery module according to claim 8, wherein both side ends of the horizontal frame are placed on top ends of the pair of vertical frames, and a first portion of both of the side ends of the horizontal frame has a smaller thickness than a second portion of both of the side ends of the horizontal frame so that the first portion is not in contact with the top ends of the pair of vertical frames, thereby forming an opening through which the transmission member is pulled out.

10. A battery pack, comprising at least one battery module according to claim 1.

11. The battery module according to claim 1, wherein the module case has a pair of open ends, and
  further comprising a pair of module covers at the pair of open ends, respectively, the pair of module covers respectively covering the pair of vertical frames, each vertical frame being between the cell stack and a respective one of the pair of module covers.

12. The battery module according to claim 1, further comprising:
  a printed circuit board; and
  a transmission member connecting the printed circuit board to the sensing member, the transmission member being between the horizontal frame and the cell stack,
  wherein the transmission member fits within a groove in a lower surface of the horizontal frame.

13. The battery module according to claim 1, wherein a width of the horizontal frame is equal to a distance between the pair of vertical frames, the groove extending along the entire width of the lower surface of the horizontal frame.

14. The battery module according to claim 1, wherein the arc is convex facing the cell stack.

15. The battery module according to claim 1, wherein the arc extends between a pair of slots.

* * * * *